United States Patent
Byun et al.

(10) Patent No.: US 10,791,540 B2
(45) Date of Patent: Sep. 29, 2020

(54) METHOD AND APPARATUS FOR KEEPING SCG CONFIGURATION

(71) Applicant: LG Electronics Inc., Seoul (KR)

(72) Inventors: Bokyung Byun, Seoul (KR); Youngdae Lee, Seoul (KR); Jaewook Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/613,250

(22) PCT Filed: Jul. 26, 2018

(86) PCT No.: PCT/KR2018/008462
§ 371 (c)(1),
(2) Date: Nov. 13, 2019

(87) PCT Pub. No.: WO2019/022531
PCT Pub. Date: Jan. 31, 2019

(65) Prior Publication Data
US 2020/0205123 A1 Jun. 25, 2020

Related U.S. Application Data

(60) Provisional application No. 62/537,002, filed on Jul. 26, 2017.

(51) Int. Cl.
*H04W 68/02* (2009.01)
*H04W 76/27* (2018.01)

(52) U.S. Cl.
CPC .......... *H04W 68/02* (2013.01); *H04W 76/27* (2018.02)

(58) Field of Classification Search
None
See application file for complete search history.

(56) References Cited

U.S. PATENT DOCUMENTS

2015/0173047 A1 6/2015 Yamada
2016/0044743 A1 2/2016 Xu et al.

FOREIGN PATENT DOCUMENTS

WO 2016021890 2/2016

OTHER PUBLICATIONS

LG Electronics Inc., "Paging response to CN paging in RRC_INACTIVE," R2-1704546, 3GPP TSG-RAN WG2 Meeting #98, Hangzhou, China, May 4, 2017, see section 2.
LG Electronics Inc., "Handling of receiving invalid SCG configuration in EN-DC," R2-1702947, 3GPP TSG-RAN2 Meeting #97Bis, Spokane, USA, Mar. 24, 2017, see section 2.
Qualcomm Incorporated, "MR-DC Mode in Inactive", 3GPP TSG-RAN WG2 Meeting NR ad-hoc 2, Jun. 27-29, 2017, R2-1706892.
Qualcomm Incorporated, "RRC_INACTIVE with MR_DC", 3GPP TSG-RAN WG3 Meeting NR Ad-Hoc 2, Jun. 27-29, 2017, R2-172430.

*Primary Examiner* — Gary Lafontant
(74) *Attorney, Agent, or Firm* — Dentons US LLP

(57) ABSTRACT

Provided are a method for keeping, by a user equipment (UE), a secondary cell group (SCG) configuration in a wireless communication system, and an apparatus supporting the same. The method may include: receiving radio access network (RAN) paging message from a base station; determining whether or not to keep a SCG configuration stored in the UE, based on the RAN paging message; and if the RAN paging message includes information related to a secondary base station, keeping the SCG configuration in an RRC resume procedure.

16 Claims, 13 Drawing Sheets

METHOD AND APPARATUS FOR KEEPING SCG CONFIGURATION

This application is the National Stage filing under 35 U.S.C. 371 of International Application No. PCT/KR2018/008462, filed on Jul. 26, 2018, which claims the benefit of U.S. Provisional Application No. 62/537,002 filed on Jul. 26, 2017, the contents of which are all hereby incorporated by reference herein in their entirety.

BACKGROUND OF THE DISCLOSURE

Field of the Disclosure

The present invention relates to a wireless communication system, and more particularly, to a method for a user equipment (UE) to keep or release a secondary cell group (SCG) configuration and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE DISCLOSURE

Meanwhile, it is likely almost UEs except UE in RRC_CONNECTED would stay in RRC_INACTIVE since the design objective of NR is to allow a UE to stay in "always connected". Thus, RRC connection suspension to RRC_INACTIVE with DC configuration may be supported. If a UE configured with DC moves to RRC_INACTIVE, since NG-RAN connection is maintained while in RRC_INACTIVE, data (e.g. user plane data) may arrive at secondary node (SN). In this case, it is more beneficial to resume secondary cell group (SCG) bearer to receive data and/or signaling directly. However, since the UE in RRC_INACTIVE can move without notification to the network within pre-configured RNA, the SCG configuration stored in the UE may be not valid. In addition, even if the RAN paging due to incoming data and/or signaling at master node (MN), it may not be necessary to resume a SCG configuration that is not already valid. Thus, a method for a UE to manage the SCG configuration efficiently upon receiving the RAN paging and an apparatus supporting the same need to be proposed.

One embodiment provides a method for keeping, by a user equipment (UE), a secondary cell group (SCG) configuration in a wireless communication system. The method may include: receiving radio access network (RAN) paging message from a base station; determining whether or not to keep a SCG configuration stored in the UE, based on the RAN paging message; and if the RAN paging message includes information related to a secondary base station, keeping the SCG configuration in an RRC resume procedure.

Another embodiment provides a user equipment (UE) keeping a secondary cell group (SCG) configuration in a wireless communication system. The UE may include: a memory; a transceiver; and a processor, connected to the memory and the transceiver, that: controls the transceiver to receive radio access network (RAN) paging message from a base station; determines whether or not to keep a SCG configuration stored in the UE, based on the RAN paging message; and if the RAN paging message includes information related to a secondary base station, keeps the SCG configuration in an RRC resume procedure.

The SCG configuration can be kept in an RRC resume procedure.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
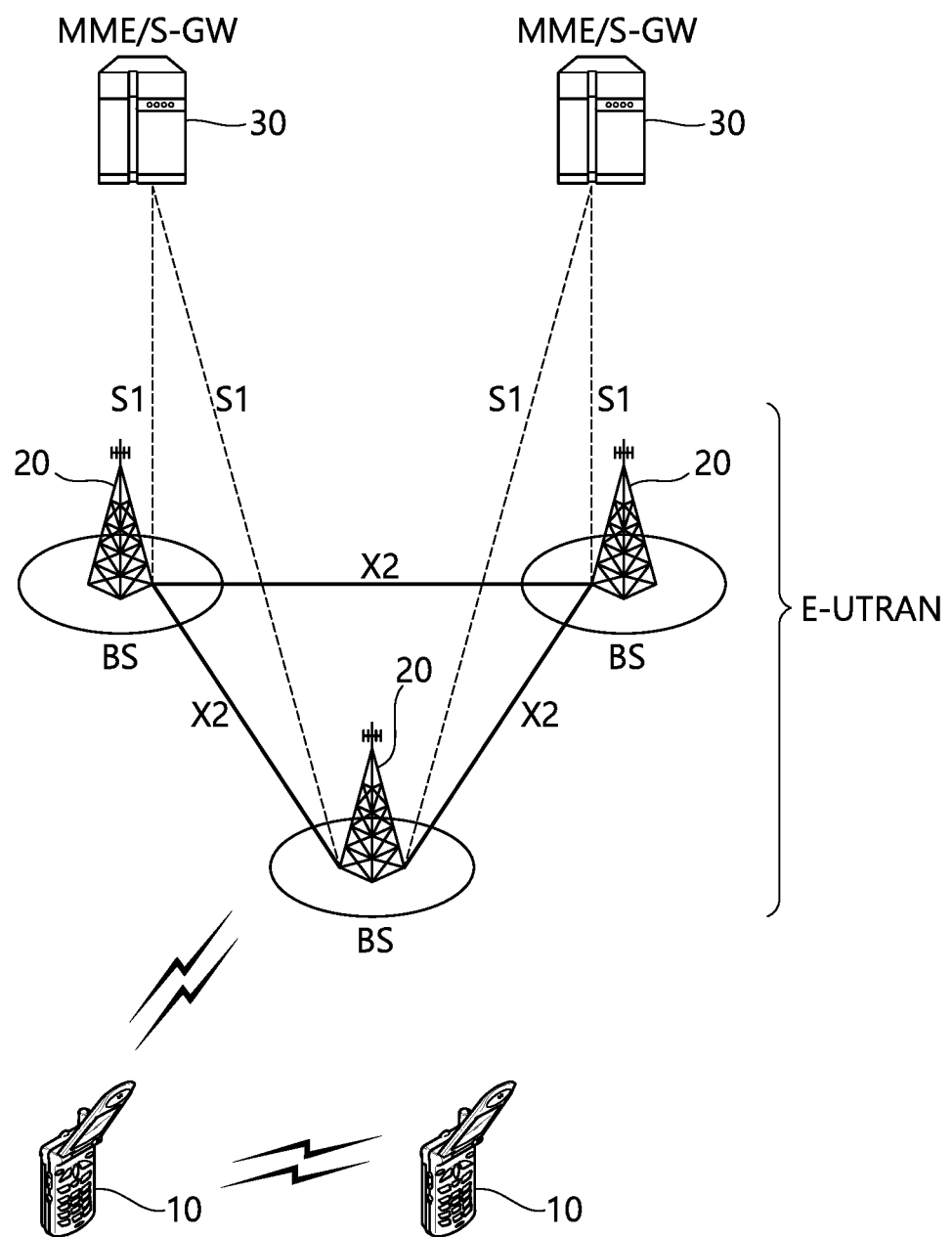
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
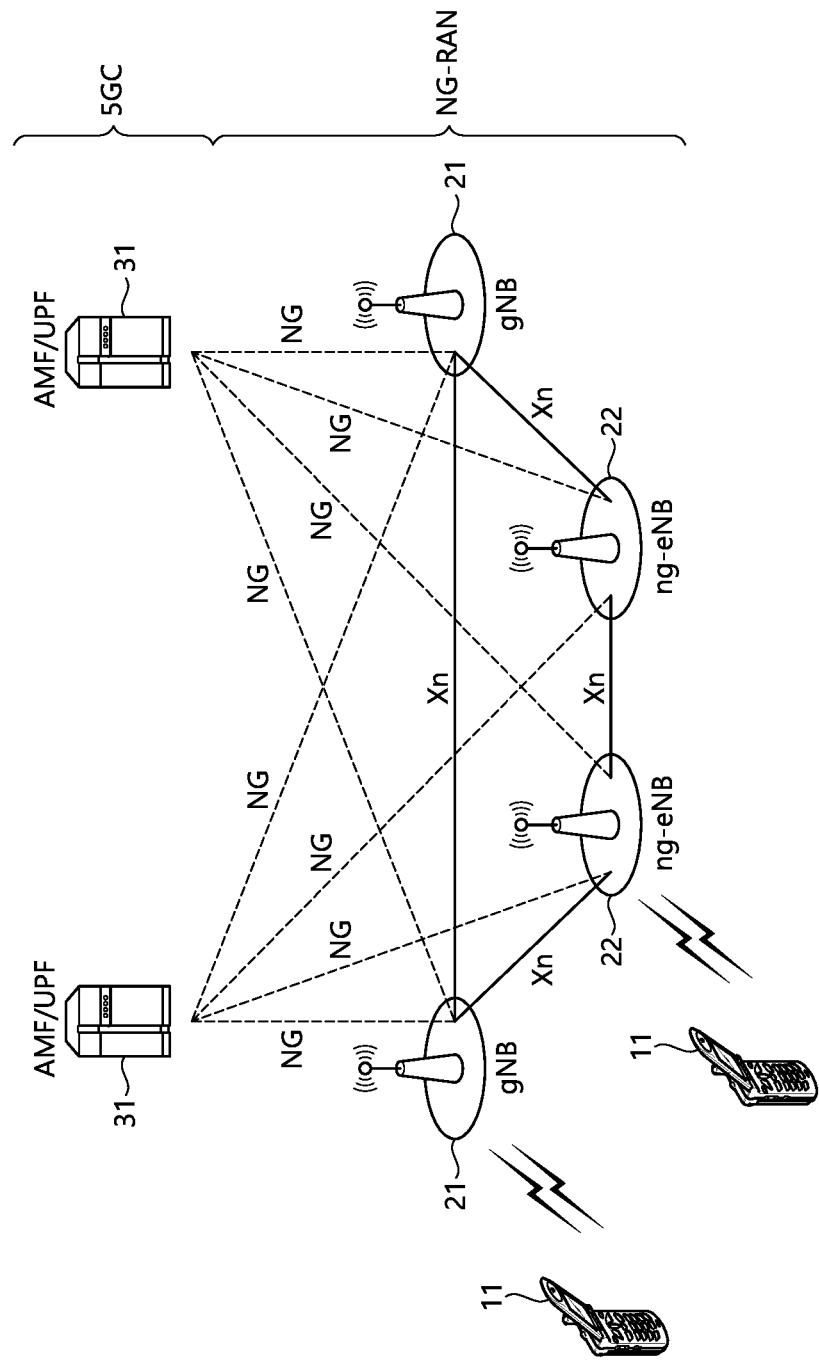
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
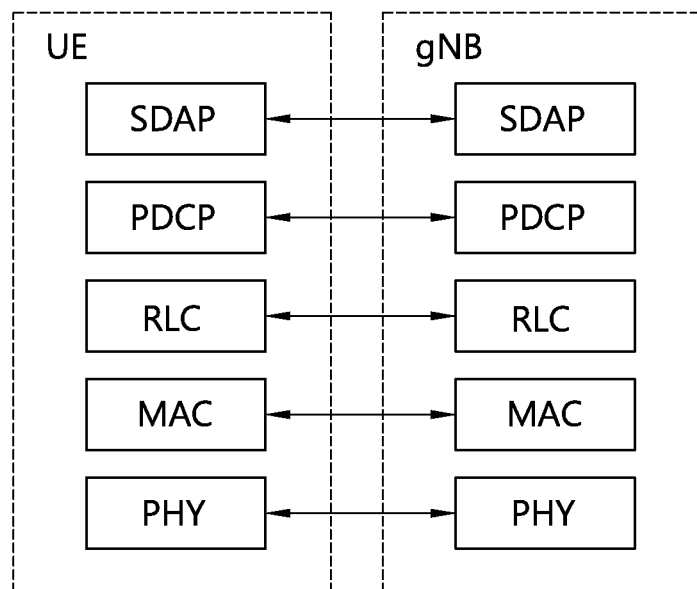
FIG. 3 shows a block diagram of a user plane protocol stack to which technical features of the present invention can be applied.
Figure 4:
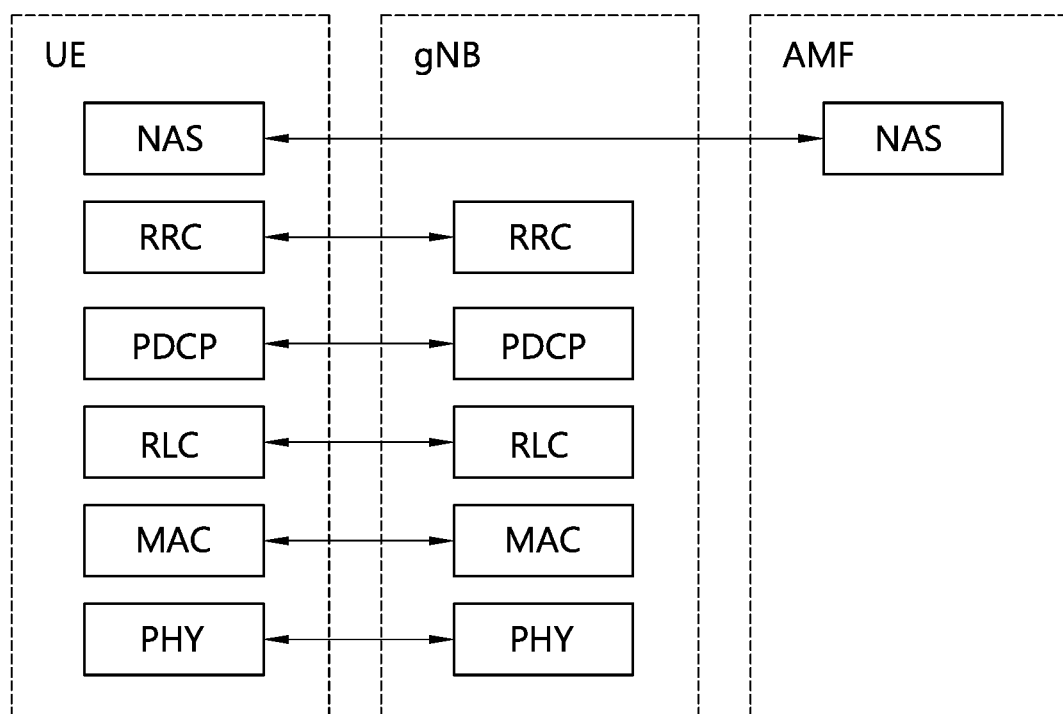
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH)

used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
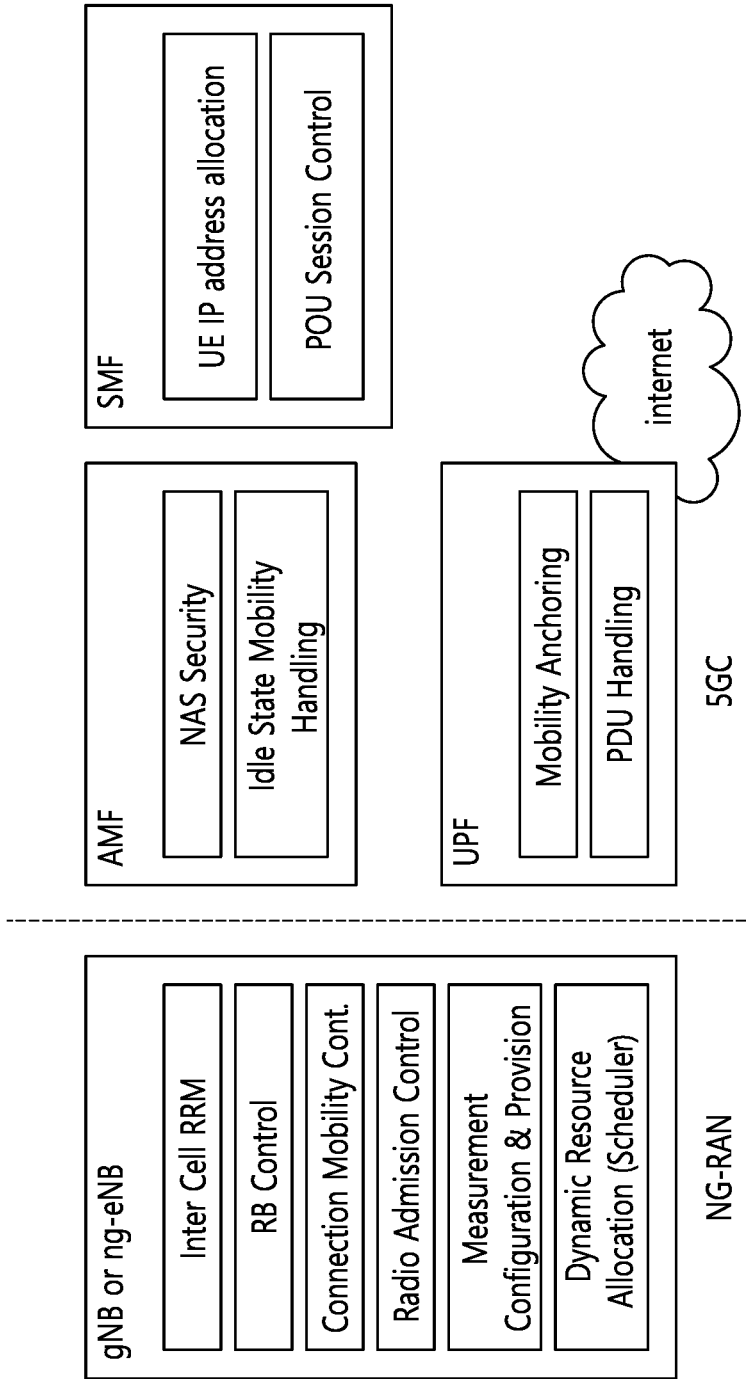
FIG. 5 shows functional split between NG-RAN and 5GC to which technical features of the present invention can be applied.

FIG. 5 shows functional split between NG-RAN and 5GC to which technical features of the present invention can be applied.

Referring to FIG. 5, the gNB and ng-eNB may host the following functions:
  Functions for Radio Resource Management: Radio Bearer Control, Radio Admission Control, Connection Mobility Control, Dynamic allocation of resources to UEs in both uplink and downlink (scheduling);
  IP header compression, encryption and integrity protection of data;
  Selection of an AMF at UE attachment when no routing to an AMF can be determined from the information provided by the UE;
  Routing of User Plane data towards UPF(s);
  Routing of Control Plane information towards AMF;
  Connection setup and release;
  Scheduling and transmission of paging messages;
  Scheduling and transmission of system broadcast information (originated from the AMF or O&M);
  Measurement and measurement reporting configuration for mobility and scheduling;
  Transport level packet marking in the uplink;
  Session Management;
  Support of Network Slicing;
  QoS Flow management and mapping to data radio bearers;
  Support of UEs in RRC_INACTIVE state;
  Distribution function for NAS messages;
  Radio access network sharing;
  Dual Connectivity;
  Tight interworking between NR and E-UTRA.

The Access and Mobility Management Function (AMF) may host the following main functions:
  NAS signalling termination;
  NAS signalling security;
  AS Security control;
  Inter CN node signalling for mobility between 3GPP access networks;
  Idle mode UE Reachability (including control and execution of paging retransmission);
  Registration Area management;
  Support of intra-system and inter-system mobility;
  Access Authentication;
  Access Authorization including check of roaming rights;
  Mobility management control (subscription and policies);
  Support of Network Slicing;
  SMF selection.

The User Plane Function (UPF) may host the following main functions:
  Anchor point for Intra-/Inter-RAT mobility (when applicable);
  External PDU session point of interconnect to Data Network;
  Packet routing & forwarding;
  Packet inspection and User plane part of Policy rule enforcement;
  Traffic usage reporting;
  Uplink classifier to support routing traffic flows to a data network;
  Branching point to support multi-homed PDU session;
  QoS handling for user plane, e.g. packet filtering, gating, UL/DL rate enforcement;
  Uplink Traffic verification (SDF to QoS flow mapping);
  Downlink packet buffering and downlink data notification triggering.

The Session Management function (SMF) may host the following main functions:
  Session Management;
  UE IP address allocation and management;
  Selection and control of UP function;
  Configures traffic steering at UPF to route traffic to proper destination;
  Control part of policy enforcement and QoS;
  Downlink Data Notification.

Hereinafter, Multi-RAT Dual Connectivity (MR-DC) is described.

NG-RAN may support MR-DC operation whereby a UE in RRC_CONNECTED is configured to utilize radio resources provided by two distinct schedulers, located in two different NG-RAN nodes connected via a non-ideal backhaul and providing either E-UTRA (i.e. if the node is an ng-eNB) or NR access (i.e. if the node is a gNB). One node may act as the master node (MN) and the other as the secondary node (SN). The MN and SN may be connected via a network interface and at least the MN is connected to the core network.

Figure 6:
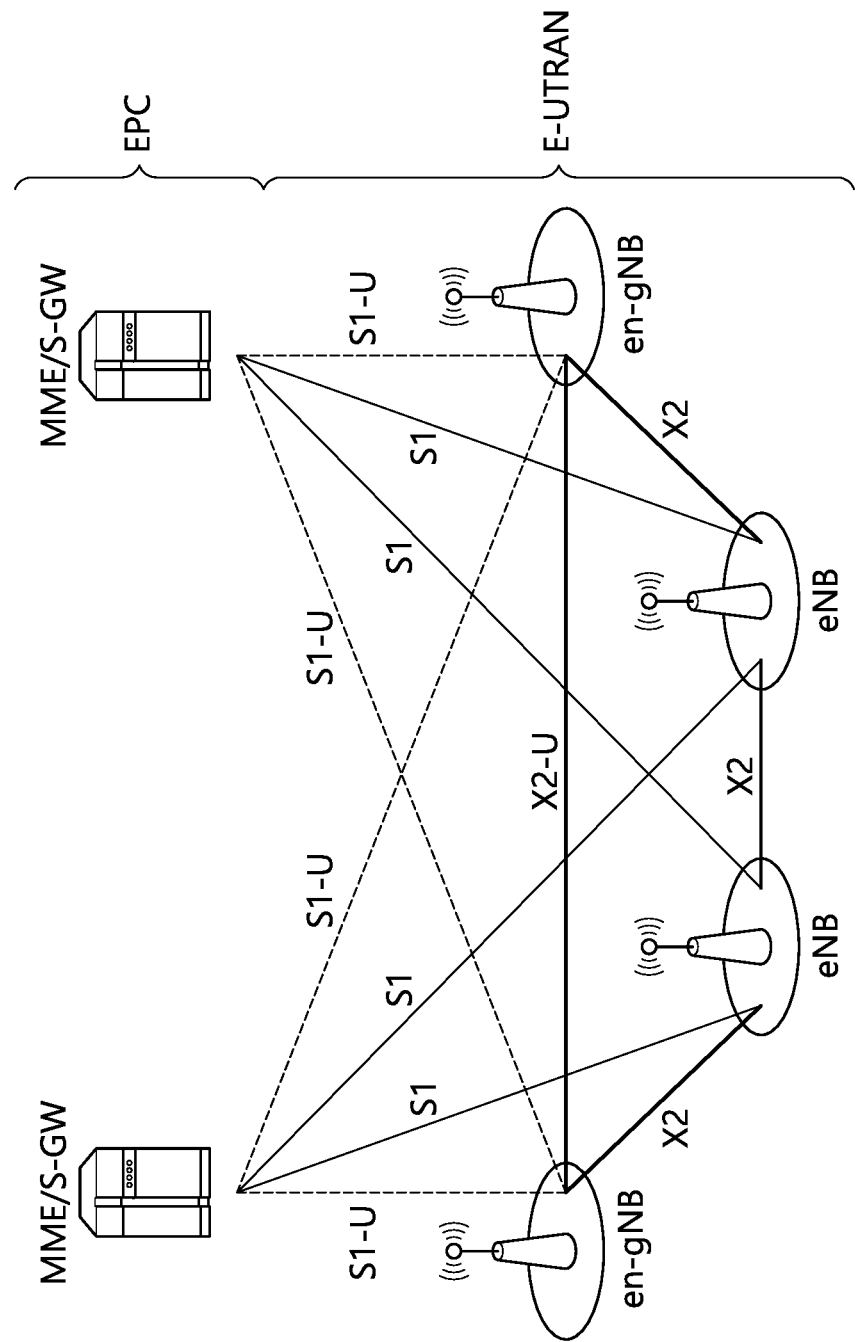
FIG. 6 shows architecture of MR-DC with the EPC to which technical features of the present invention can be applied.

FIG. 6 shows architecture of MR-DC with the EPC to which technical features of the present invention can be applied.

E-UTRAN may support MR-DC via E-UTRA-NR Dual Connectivity (EN-DC), in which a UE is connected to one eNB that acts as a MN and one en-gNB that acts as a SN. The eNB may be connected to the EPC via the S1 interface and to the en-gNB via the X2 interface. The en-gNB may also be connected to the EPC via the S1-U interface and other en-gNBs via the X2-U interface.

Furthermore, NG-RAN may support NG-RAN E-UTRA-NR Dual Connectivity (NGEN-DC), in which a UE is connected to one ng-eNB that acts as a MN and one gNB that acts as a SN. The ng-eNB is connected to the 5GC and the gNB is connected to the ng-eNB via the Xn interface. Furthermore, NG-RAN may support NR-E-UTRA Dual Connectivity (NE-DC), in which a UE is connected to one gNB that acts as a MN and one ng-eNB that acts as a SN. The gNB is connected to 5GC and the ng-eNB is connected to the gNB via the Xn interface.

Hereinafter, RRC inactive state is described.

RRC_INACTIVE is a state where a UE remains in connection management (CM)-CONNECTED and can move within an area configured by NG-RAN without notifying NG-RAN. In RRC_INACTIVE, the last serving gNB node keeps the UE context and the UE-associated NG connection with the serving AMF and UPF.

If the last serving gNB receives DL data from the UPF or DL signalling from the AMF (except the UE Release Command and Reset messages) while the UE is in RRC_INACTIVE, it pages in the cells corresponding to the RAN-based Notification Area (RNA) and may send XnAP RAN Paging to neighbour gNB(s) if the RNA includes cells of neighbour gNB(s).

If the last serving NG-RAN node receives the UE Release Command message from the AMF while the UE is in RRC_INACTIVE, it shall reply with the UE Context Release Complete message.

The AMF provides to the NG-RAN node the RRC Inactive Assistant Information to assist the NG-RAN node's decision whether the UE can be sent to RRC_INACTIVE. The RRC Inactive Assistant Information includes the registration area configured for the UE, the UE specific DRX, Periodic Registration Update timer, an indication if the UE is configured with Mobile Initiated Connection Only (MICO) mode by the AMF, and UE Identity Index value. The UE registration area is taken into account by the NG-RAN node when configuring the RAN-based notification area. The UE specific DRX and UE Identity Index value are used by the NG-RAN node for RAN paging. The Periodic Registration Update timer is taken into account by the NG-RAN node to configure Periodic RAN Notification Area Update timer.

At transition to RRC_INACTIVE the NG-RAN node may configure the UE with a periodic RNA Update timer value.

If the UE accesses a gNB other than the last serving gNB, the receiving gNB triggers the XnAP Retrieve UE Context procedure to get the UE context from the last serving gNB and may also trigger a Data Forwarding procedure including tunnel information for potential recovery of data from the last serving gNB. Upon successful UE context retrieval, the receiving gNB shall perform the slice-aware admission control in case of receiving slice information and becomes the serving gNB and it further triggers the NGAP Path Switch Request procedure. After the path switch procedure, the serving gNB triggers release of the UE context at the last serving gNB by means of the XnAP UE Context Release procedure.

In case the UE is not reachable at the last serving gNB, the gNB shall fail AMF initiated UE-associated class 1 procedures if any, and shall trigger the NAS Non Delivery Indication procedure to report the non-delivery of any NAS PDUs received from the AMF for the UE.

If the UE accesses a gNB other than the last serving gNB and the receiving gNB does not find a valid UE Context, gNB performs establishment of a new RRC connection instead of resumption of the previous RRC connection.

A UE in the RRC_INACTIVE state is required to initiate RNA update procedure when it moves out of the configured RNA. When receiving RNA update request from the UE, the receiving gNB triggers the XnAP Retrieve UE Context procedure to get the UE context from the last serving gNB and may decide to send the UE back to RRC_INACTIVE state, move the UE into RRC_CONNECTED state, or send the UE to RRC_IDLE.

Figure 7:
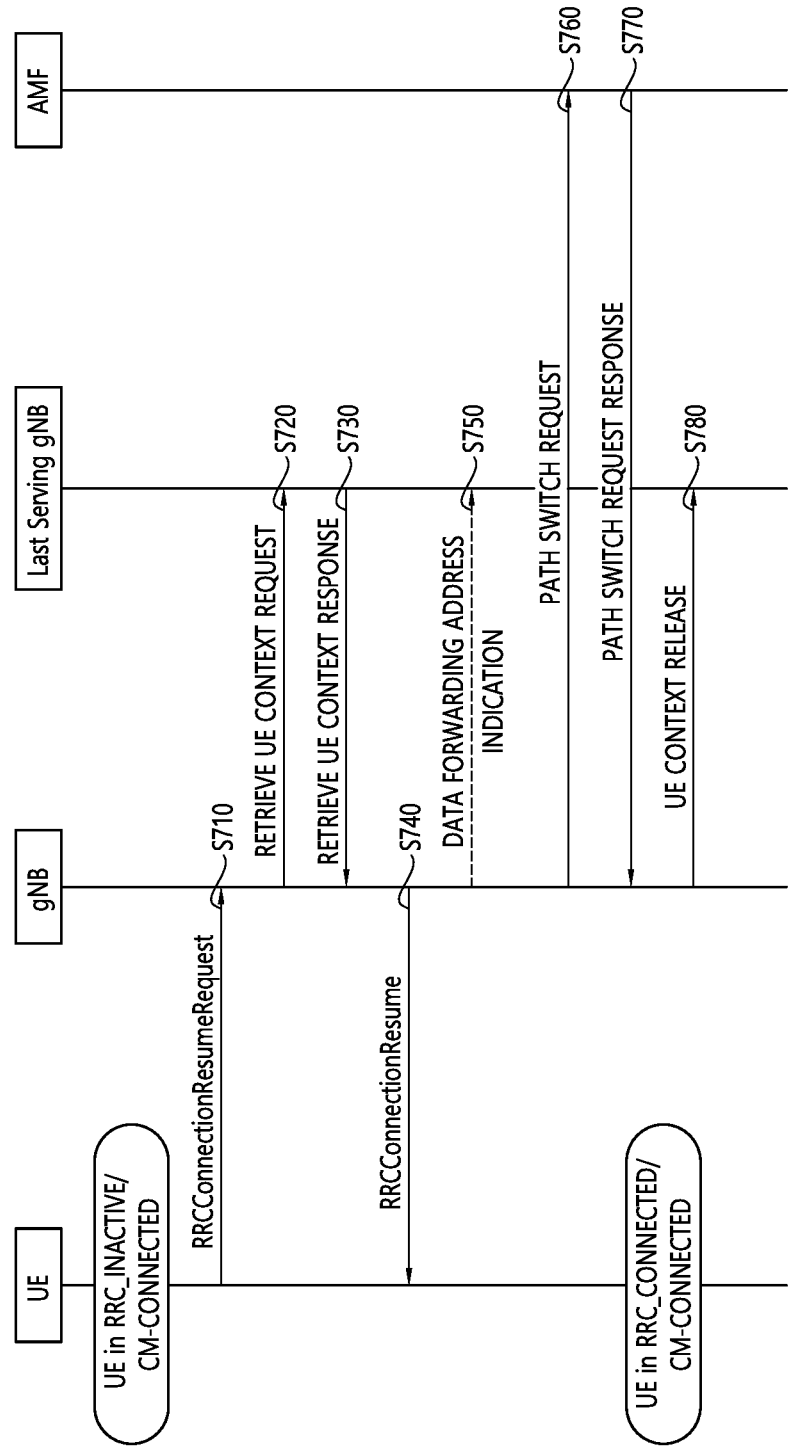
FIG. 7 shows a RRC state transition procedure triggered by a UE to which technical features of the present invention can be applied.

FIG. 7 shows a RRC state transition procedure triggered by a UE to which technical features of the present invention can be applied.

Referring to FIG. 7, in step S710, the UE resumes from RRC_INACTIVE, providing the Inactive RNTI (I-RNTI), allocated by the last serving gNB.

In step S720, the gNB, if able to resolve the gNB identity contained in the I-RNTI, requests the last serving gNB to provide UE Context data.

In step S730, the last serving gNB provides UE context data.

In step S740, the gNB completes the resumption of the RRC connection.

In step S750, if loss of DL user data buffered in the last serving gNB shall be prevented, the gNB provides forwarding addresses.

In step S760 and S770, the gNB performs path switch.

In step S780, the gNB triggers the release of the UE resources at the last serving gNB.

After step S710, when the gNB decides to reject the Resume Request and keep the UE in RRC_INACTIVE without any reconfiguration, or when the gNB decides to setup a new RRC connection, SRB0 (without security) can be used. When the gNB decides to reconfigure the UE (e.g. with a new DRX cycle or RNA) or when the gNB decides to push the UE to RRC_IDLE, SRB1 (with at least integrity protection) shall be used. SRB1 can only be used once the UE Context is retrieved i.e. after step S730.

Figure 8:
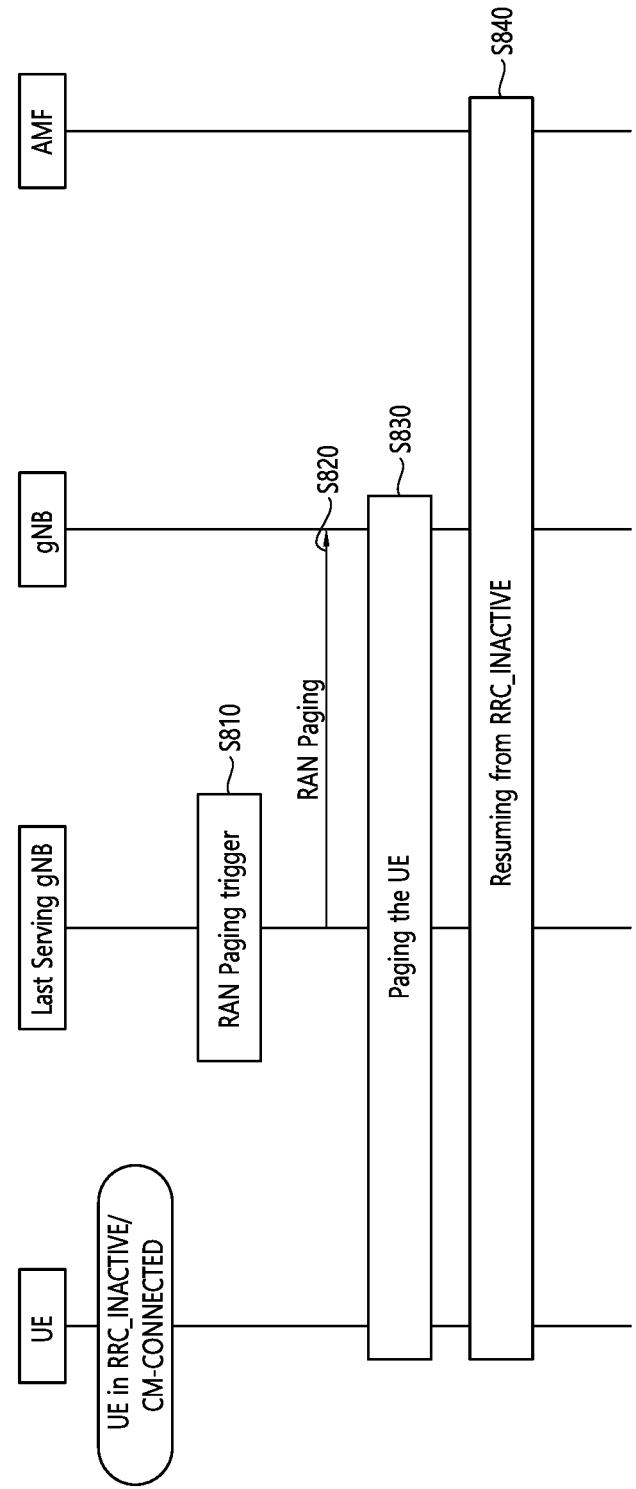
FIG. 8 shows a RRC state transition procedure triggered by a network to which technical features of the present invention can be applied.

FIG. 8 shows a RRC state transition procedure triggered by a network to which technical features of the present invention can be applied.

Referring to FIG. 8, in step S810, a RAN paging trigger event occurs (incoming DL user plane, DL signalling from 5GC, etc.).

In step S820, RAN paging is triggered; either only in the cells controlled by the last serving gNB or also by means of Xn RAN Paging in cells controlled by other gNBs, configured to the UE in the RNA.

In step S830, the UE is paged with the I-RNTI.

In step S840, if the UE has been successfully reached, it attempts to resume from RRC_INACTIVE, as described in FIG. 7.

Meanwhile, considering that initial NR deployment could be like small cell in LTE, most UEs are likely to be configured with DC while in RRC_CONNECTED. In addition, since the design objective of NR is to allow a UE to stay in "always connected", it is likely almost UEs except UE in RRC_CONNECTED would stay in RRC_INACTIVE. Thus, RRC connection suspension to RRC_INACTIVE with DC configuration may be supported.

If a UE configured with DC moves to RRC_INACTIVE, since NG-RAN connection is maintained while in RRC_INACTIVE, data (e.g. user plane data) may arrive at secondary node (SN). In this case, it is more beneficial to resume secondary cell group (SCG) bearer to receive data and/or signaling directly. However, since the UE in RRC_INACTIVE can move without notification to the network within pre-configured RNA, the SCG configuration stored in the UE may be not valid. For example, in case that the UE responds to the RAN paging, if the UE moves out of coverage of the SCG cell, the SCG configuration stored in the UE may be not valid. In addition, even if the RAN paging due to incoming data and/or signaling at master node (MN), it may not be necessary to resume a SCG configuration that is not already valid. Thus, a method for a UE to manage the SCG configuration efficiently upon receiving the RAN paging and an apparatus supporting the same need to be proposed.

Hereinafter, a method for a UE to keep or release a SCG configuration and an apparatus supporting the same according to an embodiment of the present invention are described in detail. In the specification, RRC_INACTIVE may be referred to as inactive condition, lightweight connection in LTE, a suspended state or lightweight connection in eLTE. The RAN node may be at least one of gNB in NR, eNB in LTE or eNB in eLTE. The MN and SN may be referred to as master base station and secondary base station, respectively. In addition, the MN and SN configured with DC may have at least one of combination of NR and NR, E-UTRAN and E-UTRAN, NR and E-UTRAN or E-UTRAN and NR.

According to an embodiment of the present invention, the UE can handle the SCG configuration in response to the RAN paging. The UE may be configured with DC. Further, the UE may be in RRC_INACTIVE state. The UE may be configured with DC and transit to inactive condition while the UE may keep the DC configuration.

Figure 9:
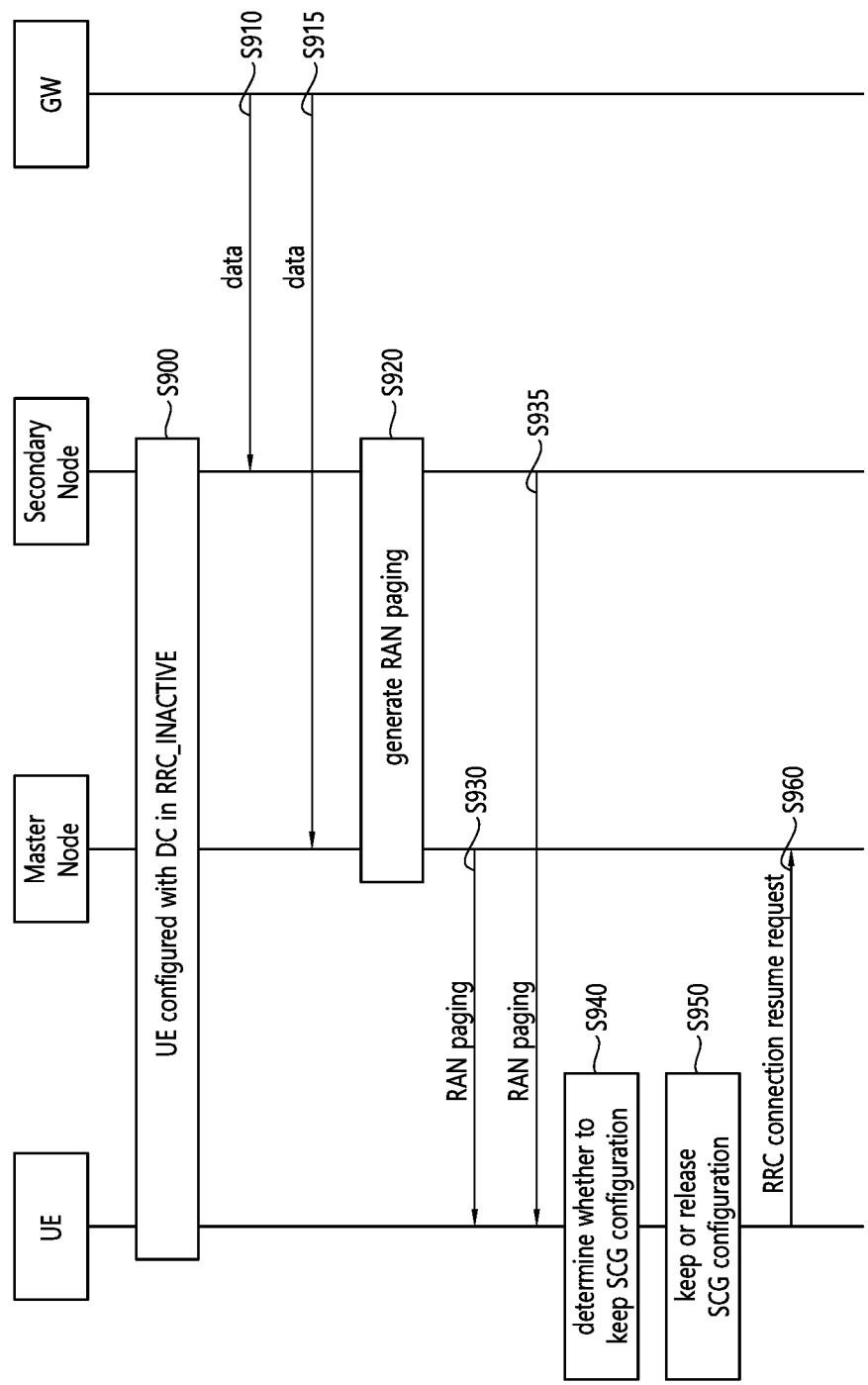
FIG. 9 shows a procedure for handling a SCG configuration in response to a RAN paging according to an embodiment of the present invention.

FIG. 9 shows a procedure for handling a SCG configuration in response to a RAN paging according to an embodiment of the present invention.

Referring to FIG. 9, in step S900, the UE may be configured with DC. Further, the UE may enter RRC_INACTIVE state.

In step S910, an upper layer may transmits data and/or signaling to a secondary node. Alternatively, in step S915, the upper layer may transmit data and/or signaling to a master node. The upper layer may be a gateway.

When the data and/or signaling for the UE arrives at the secondary node (i.e. S910), the RAN paging message may be transmitted in the following options. The paging message may indicate that data and/or signaling is received at the secondary node.

Option 1 (RAN Paging Message Generated by Master Node)

In step S920, the master node may generate the RAN paging message with an indicator of paging caused by data and/or signaling received at the secondary node. For example, the RAN paging message may include an indication indicating that the RAN paging message is caused by data received at the secondary node. For this, when the data and/or signaling for the UE arrives at the secondary node (i.e. S910), the secondary node may send an indication indicating that the data and/or signaling arrives at the secondary node, to the master node. When the data and/or signaling for the UE arrives at the secondary node (i.e. S910), the secondary node may forward the incoming data and/or signaling to the master node.

The RAN paging message generated by the master node may be transmitted via the master node or the secondary node. For example, in step S930, the RAN paging message generated by the master node may be transmitted via the master node. For example, in step S935, the RAN paging message generated by the master node may be transmitted via the secondary node. In this case, the RAN paging message generated by the master node may be transferred to the secondary node.

Option 2 (RAN Paging Message Generated by Secondary Node)

In step S920, the secondary node may generate the RAN paging message by itself. The RAN paging message may include a specific RAN UE ID assigned only to the secondary node, i.e. allocated by the secondary node. The RAN paging message generated by the secondary node may be transmitted via the master node or the secondary node. For example, in step S930, the RAN paging message generated by the secondary node may be transmitted via the master node. In this case, the RAN paging message generated by the secondary node may be transferred to the master node. For example, in step S935, the RAN paging message generated by the secondary node may be transmitted via the secondary node. If RAN UE ID allocated by the secondary node is provided to the UE, the UE may monitor paging message in both primary frequency and frequency associated with PSCell.

Option 3 (RAN Paging Message Generated by Master Node)

In step S920, the master node may generate the RAN paging message. The RAN paging message may include a specific RAN UE ID allocated by the master node. The specific RAN UE ID allocated by the master node may be capable of distinguishing the UE in the secondary node. That is, the master node may allocate the specific RAN UE ID to allow the secondary node to distinguish the UE. The RAN paging message generated by the master node may be transmitted via the master node or the secondary node. For example, in step S930, the RAN paging message generated by the master node may be transmitted via the master node. For example, in step S935, the RAN paging message generated by the master node may be transmitted via the secondary node. In this case, the RAN paging message generated by the master node may be transferred to the secondary node. If RAN UE ID allocated by the master node is provided to the UE, the UE may monitor paging message in both primary frequency and frequency associated with PSCell.

When the data and/or signaling for the UE arrives at the master node (i.e. S915), the RAN paging message may not include the indicator of paging caused by data and/or signaling received at the secondary node. In this case, in step S920, the master node or secondary node may generate legacy RAN paging message. The legacy RAN paging message generated by the master node or the secondary node may be transmitted via the master node or the secondary node. The legacy RAN paging message may not include the indication indicating that the RAN paging message is caused by data received at the secondary node. Also, the legacy RAN paging message may not include the specific RAN UE ID assigned only to the secondary node, i.e. allocated by the secondary node.

In step S940, the UE may determine whether or not to release a SCG configuration stored in the UE, based on the RAN paging message.

If the RAN paging message indicates incoming data and/or signaling at the secondary node, in step S950, the UE may keep the SCG configuration in an RRC resume procedure. If the RAN paging message includes the specific RAN UE ID assigned only to the secondary node, i.e. allocated by the secondary node, in step S950, the UE may keep the SCG configuration in an RRC resume procedure. If the RAN paging message includes the indicator of paging caused by data and/or signaling received at the secondary node, in step S950, the UE may keep the SCG configuration in an RRC resume procedure. If the RAN paging message includes the specific RAN UE ID allocated by the master node to allow the secondary node to distinguish the UE, in step S950, the UE may keep the SCG configuration in an RRC resume procedure. In step S960, The UE may include an indicator of whether the SCG configuration is kept or not in the message used for RRC connection activation or RRC connection resume. If the UE receives the RAN paging message indicating incoming data and/or signaling at the secondary node, the UE may indicate that the previously configured SCG configuration is still kept or stored.

If the UE receives the RAN paging message which comes from the master node, in step S950, the UE may release SCG configuration stored in the UE. Namely, if the RAN paging message does not indicate incoming data and/or signaling at the secondary node, in step S950, the UE may release SCG configuration stored in the UE. If the UE receives a core network (CN) paging message with a CN UE ID, in step S950, the UE may release SCG configuration stored in the UE. In case of releasing SCG configuration, entire SCG configuration may be released. Alternatively, in case of releasing SCG configuration, part of SCG configuration may be released. For example, a lower layer configuration of the SCG configuration may be released, but radio bearer configuration may not be released. For example, the SCG configuration may be released except for the DRB configuration. In step S960, the UE may include an indicator of whether the SCG configuration is deleted or not in the message used for RRC connection activation or RRC connection resume. If the UE receives the RAN paging message without an indication of incoming data and/or signaling at the secondary node, the UE may indicate that the previously configured SCG configuration is released. The RAN node receiving the message from the UE may perform SN release procedure based on the indicator.

Figure 10:
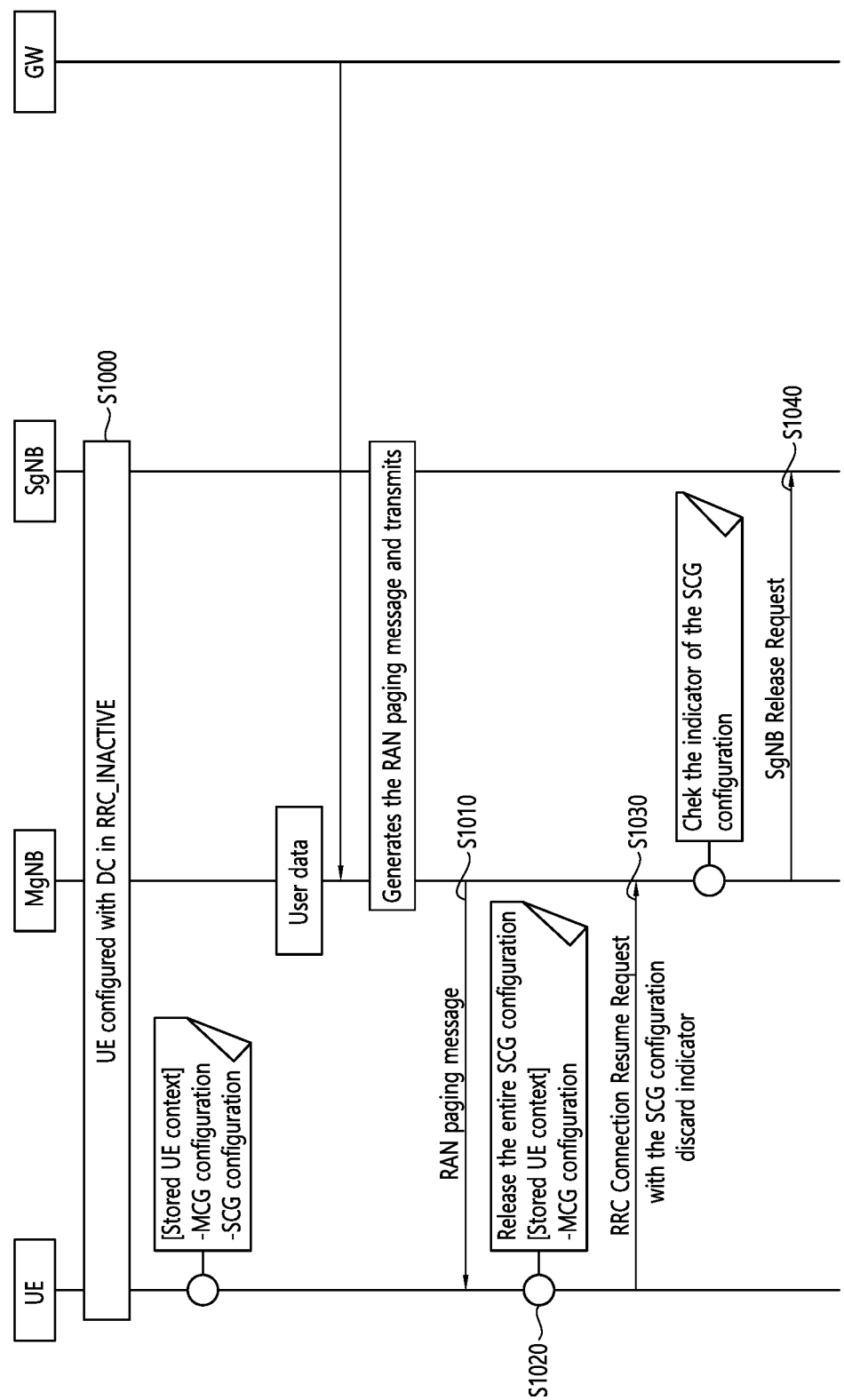
FIG. 10 shows a procedure for releasing a SCG configuration in response to a RAN paging according to an embodiment of the present invention.

FIG. 10 shows a procedure for releasing a SCG configuration in response to a RAN paging according to an embodiment of the present invention.

Referring to FIG. 10, the UE configured with DC in RRC_INACTIVE receives the RAN paging message from the master node.

In step S1000, the UE may be configured with DC and in RRC_INACTIVE state. Thus, the UE may store a master cell group (MCG) configuration and a SCG configuration.

In step S1010, the UE may receive the paging message, the ue-Identity included in the Paging Record matches the RAN UE ID assigned by the anchor gNB. Then, the UE may initiate the RRC connection resumption procedure from RRC_INACTIVE for MT calls.

In step S1020, the UE may release the SCG configuration except for the DRB configuration (as configured by drb-ToAddModListSCG).

In step S1030, the UE may initiate transmission of the RRC connection resume request message with the SCG configuration discard indicator.

In step S1040, the network may perform SgNB release procedure based on the SCG configuration discard indicator from the UE.

Figure 11:
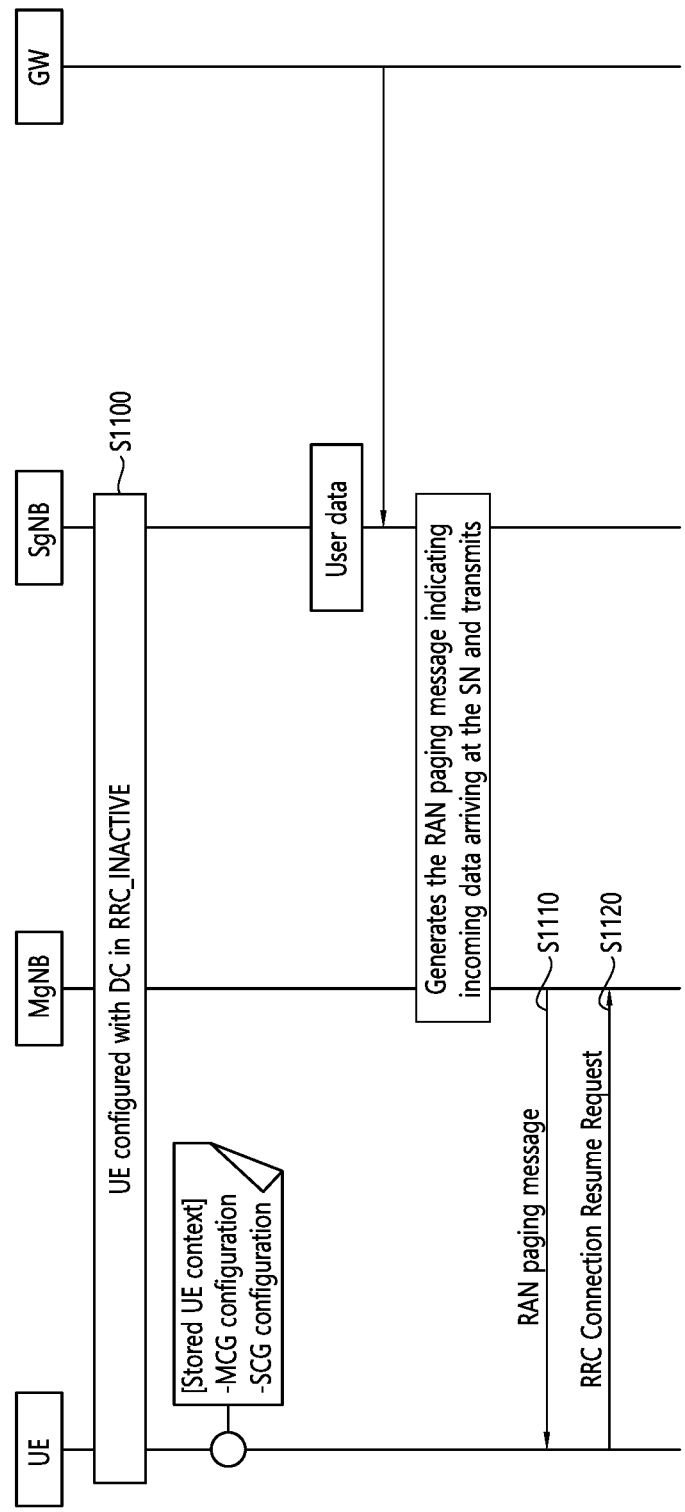
FIG. 11 shows a procedure for keeping a SCG configuration in response to a RAN paging according to an embodiment of the present invention.

FIG. 11 shows a procedure for keeping a SCG configuration in response to a RAN paging according to an embodiment of the present invention.

Referring to FIG. 11, the UE configured with DC in RRC_INACTIVE receives the RAN paging message indicating incoming data arriving at the SN.

In step S1100, the UE may be configured with DC and in RRC_INACTIVE state. Thus, the UE may store a master cell group (MCG) configuration and a SCG configuration.

In step S1110, the UE may receive the paging message indicating incoming data arriving at the secondary node, the ue-Identity included in the Paging Record matches the RAN UE ID assigned by the anchor gNB. Then, the UE may initiate the RRC connection resumption procedure from RRC_INACTIVE for MT calls.

In step S1120, the UE may initiate transmission of the RRC connection resume request message. The RRC connection resume request message may include an indicator indicating that the SCG configuration is kept. Thus, the network may not perform SgNB release procedure based on the indicator included in the RRC connection resume request message.

Figure 12:
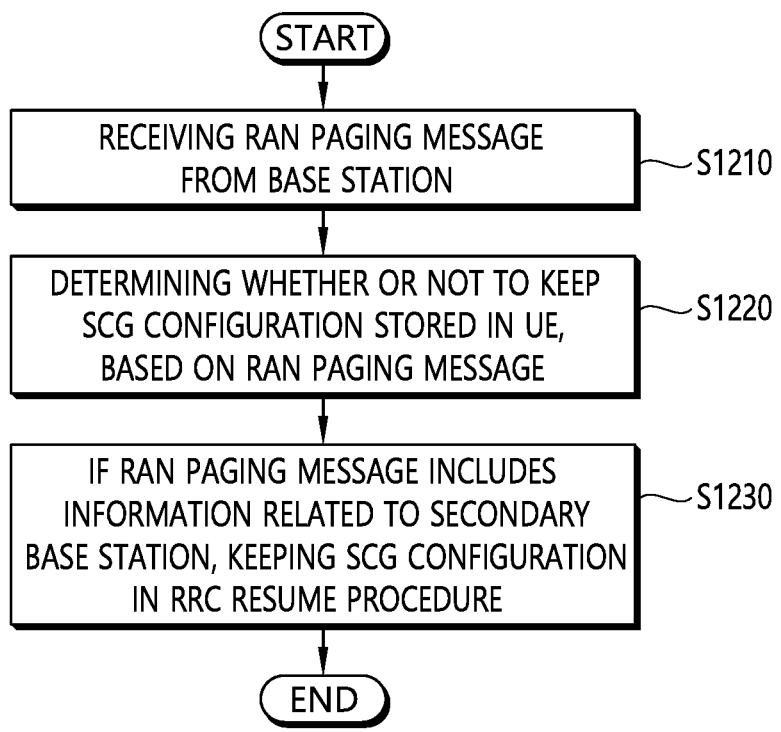
FIG. 12 is a block diagram illustrating a method for a UE to keep a SCG configuration according to an embodiment of the present invention.

FIG. 12 is a block diagram illustrating a method for a UE to keep a SCG configuration according to an embodiment of the present invention.

Referring to FIG. 12, in step S1210, the UE may receive RAN paging message from a base station. The UE may be in a RRC_INACTIVE state. The UE may be configured with dual connectivity.

In step S1220, the UE may determine whether or not to keep a SCG configuration stored in the UE, based on the RAN paging message.

In step S1230, the UE may keep the SCG configuration in an RRC resume procedure if the RAN paging message includes information related to a secondary base station. The SCG configuration may be kept upon initiating the RRC resume procedure.

The information related to the secondary base station may indicate that the RAN paging message is caused by data received at the secondary base station. The data received at the secondary base station may be data transmitted from a gateway to the secondary base station.

The RAN paging message may be generated by a master base station. An indication indicating the data received at the secondary node may be transmitted from the secondary node to the master base station, when the data is received at the secondary base station. The data received at the secondary node may be transmitted from the secondary node to a master base station, when the data is received at the secondary base station.

The information related to the secondary base station may be a RAN UE ID allocated by the secondary base station. The RAN paging message may be generated by the secondary base station.

The information related to the secondary base station may be a RAN UE ID allocated by the master base station to allow the secondary node to distinguish the UE.

Furthermore, the UE may transmit a message for RRC connection resume request indicating whether or not the SCG configuration is kept, to the base station.

Furthermore, the UE may release the SCG configuration before initiating the RRC resume procedure if the RAN paging message does not include information related to the secondary base station. The SCG configuration may be released by a master base station. In case of releasing SCG configuration, entire SCG configuration may be released. Alternatively, in case of releasing SCG configuration, part of SCG configuration may be released. For example, a lower layer configuration of the SCG configuration may be released, but radio bearer configuration may not be released. For example, the SCG configuration may be released except for the DRB configuration.

According to an embodiment of the present invention, the UE can keep the SCG configuration in an RRC resume procedure if the RAN paging message includes information related to a secondary base station. For example, the UE can keep the SCG configuration in an RRC resume procedure if the received RAN paging message indicates incoming data arriving at the secondary node. Thus, in case that user plane data arrives at the secondary node, SCG bearer can be resumed to receive data and/or signaling directly so that it is possible to prevent the SCG bearer from being released.

Figure 13:
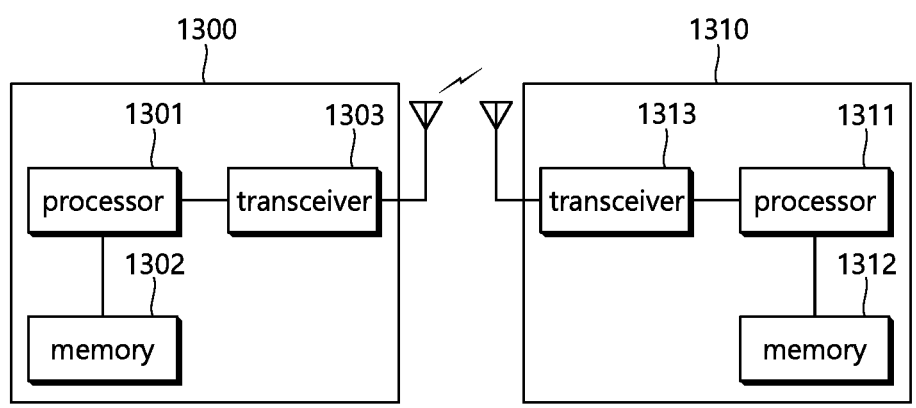
FIG. 13 is a block diagram illustrating a wireless communication system according to the embodiment of the present invention.

FIG. 13 is a block diagram illustrating a wireless communication system according to the embodiment of the present invention.

ABS 1300 includes a processor 1301, a memory 1302 and a transceiver 1303. The memory 1302 is connected to the processor 1301, and stores various information for driving the processor 1301. The transceiver 1303 is connected to the processor 1301, and transmits and/or receives radio signals. The processor 1301 implements proposed functions, processes and/or methods. In the above embodiment, an operation of the base station may be implemented by the processor 1301.

A UE 1310 includes a processor 1311, a memory 1312 and a transceiver 1313. The memory 1312 is connected to the processor 1311, and stores various information for driving the processor 1311. The transceiver 1313 is connected to the processor 1311, and transmits and/or receives radio signals. The processor 1311 implements proposed functions, processes and/or methods. In the above embodiment, an operation of the user equipment may be implemented by the processor 1311.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for keeping, by a user equipment (UE), a secondary cell group (SCG) configuration in a wireless communication system, the method comprising:
receiving radio access network (RAN) paging message from a base station;
determining whether or not to keep a SCG configuration stored in the UE, based on the RAN paging message; and
when the RAN paging message includes information related to a secondary base station,
keeping the SCG configuration in an RRC resume procedure.

2. The method of claim 1, wherein the SCG configuration is kept upon initiating the RRC resume procedure.

3. The method of claim 1, wherein the information related to the secondary base station indicates that the RAN paging message is caused by data received at the secondary base station.

4. The method of claim 3, wherein the data received at the secondary base station is data transmitted from a gateway to the secondary base station.

5. The method of claim 3, wherein the RAN paging message is generated by a master base station.

6. The method of claim 5, wherein an indication indicating the data received at the secondary node is transmitted from the secondary node to the master base station, when the data is received at the secondary base station.

7. The method of claim 5, wherein the data received at the secondary node is transmitted from the secondary node to the master base station, when the data is received at the secondary base station.

8. The method of claim 1, wherein the information related to the secondary base station is a RAN UE ID allocated by the secondary base station.

9. The method of claim 8, wherein the RAN paging message is generated by the secondary base station.

10. The method of claim 1, wherein the information related to the secondary base station is a RAN UE ID allocated by the master base station to allow the secondary node to distinguish the UE.

11. The method of claim 1, wherein the base station is one of a master base station or the secondary base station.

12. The method of claim 1, further comprising:
transmitting a message for RRC connection resume request indicating whether or not the SCG configuration is kept, to the base station.

13. The method of claim 1, further comprising:
When the RAN paging message does not include information related to the secondary base station,
releasing the SCG configuration before initiating the RRC resume procedure.

14. The method of claim 1, wherein the UE is in a RRC_INACTIVE state.

15. A user equipment (UE) keeping a secondary cell group (SCG) configuration in a wireless communication system, the UE comprising:
a memory; a transceiver; and
a processor, connected to the memory and the transceiver, that:
controls the transceiver to receive radio access network (RAN) paging message from a base station;
determines whether or not to keep a SCG configuration stored in the UE, based on the RAN paging message; and when the RAN paging message includes information related to a secondary base station,
keeps the SCG configuration in an RRC resume procedure.

16. The method of claim 1, wherein the UE communicates with at least one of a mobile terminal, a network or autonomous vehicles other than the UE.

* * * * *